United States Patent
Bennington

(10) Patent No.: US 6,409,186 B2
(45) Date of Patent: *Jun. 25, 2002

(54) MOBILE CART

(76) Inventor: Eugene Kevin Bennington, 1715 E. Fowler Ave., Suite 221, Tampa, FL (US) 33612

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,996

(22) Filed: Feb. 1, 1999

Related U.S. Application Data

(63) Continuation-in-part of application No. 09/000,587, filed on Dec. 30, 1997.
(60) Provisional application No. 60/109,699, filed on Nov. 24, 1998.

(51) Int. Cl.$^7$ .............................. B62D 51/04; B60P 1/34
(52) U.S. Cl. .................... 280/43.23; 180/19.3; 414/495
(58) Field of Search ............................ 280/6.15, 6.153, 280/43.17, 43.23, 47.34; 180/19.3; 165/919; 414/498, 462, 467, 495

(56) References Cited

U.S. PATENT DOCUMENTS

| | | | |
|---|---|---|---|
| 1,513,357 A | 10/1924 | Webber | |
| 2,309,513 A | 1/1943 | Kramer | |
| 2,937,879 A | * 5/1960 | Lion | .................. 280/43.21 |
| 2,982,578 A | 5/1961 | Lowe | |
| 3,223,429 A | 12/1965 | Hastings | |
| 3,255,812 A | 6/1966 | Bayane et al. | |
| 3,493,262 A | 2/1970 | Ferneau | |
| 3,637,232 A | 1/1972 | Bourgraf et al. | |
| 3,722,721 A | * 3/1973 | Bennett | ........................ 414/498 |
| 3,868,123 A | 2/1975 | Berg et al. | |
| 4,103,736 A | 8/1978 | Colato et al. | |
| 4,167,983 A | 9/1979 | Seider et al. | |
| 4,369,985 A | 1/1983 | Bourgraf et al. | |
| 4,392,662 A | 7/1983 | Höglinger | ................. 280/43.23 |
| 4,460,064 A | * 7/1984 | Lutz et al. | .................. 187/222 |
| 5,048,857 A | 9/1991 | Stevens | |
| 5,159,973 A | 11/1992 | Pennington et al. | ....... 165/48.1 |
| 5,240,320 A | 8/1993 | Yerman | .................. 312/351.11 |
| 5,306,029 A | 4/1994 | Kaiser, II | ..................... 280/30 |
| 5,538,386 A | * 7/1996 | Scheibel | ..................... 414/467 |
| 5,649,718 A | * 7/1997 | Groglio | ..................... 280/641 |
| 5,800,114 A | 9/1998 | Secondi | ..................... 414/458 |
| 6,077,024 A | * 6/2000 | Trueblood | ................... 414/462 |

* cited by examiner

*Primary Examiner*—Eric Culbreth
*Assistant Examiner*—David R. Dunn
(74) *Attorney, Agent, or Firm*—Saliwanchik, Lloyd & Saliwanchik

(57) ABSTRACT

The present invention pertains to a mobile cart. In a specific embodiment, the subject cart can be automatically loaded onto and from a raised platform. In a specific embodiment, the subject cart can be utilized as a catering cart for transporting and serving food and beverages. The subject cart can utilize thermoelectric devices for heating and cooling of food stored in, and served from, the cart. Lift mechanisms can allow the caterer to raise and lower the food cart, which can assist in loading and unloading the subject cart from a transport vehicle. The subject cart can also provide storage areas for foods, beverages, and utensils. Advantageously, the subject invention can allow a caterer to (i) load the subject cart with hot and cold food; (ii) load the cart into a transport vehicle; (iii) transport the cart to the customer's site; (iv) unload the cart from the transport vehicle; (v) quickly and easily transport the cart, containing hot and cold food, to the serving location; (vi) serve the customers; and (vii) quickly load the cart back into the transport vehicle and return to the caterer's base of operation. A power source, for example batteries, may be utilized to supply the power needed for heating and cooling and for self-propulsion, if desired.

32 Claims, 11 Drawing Sheets

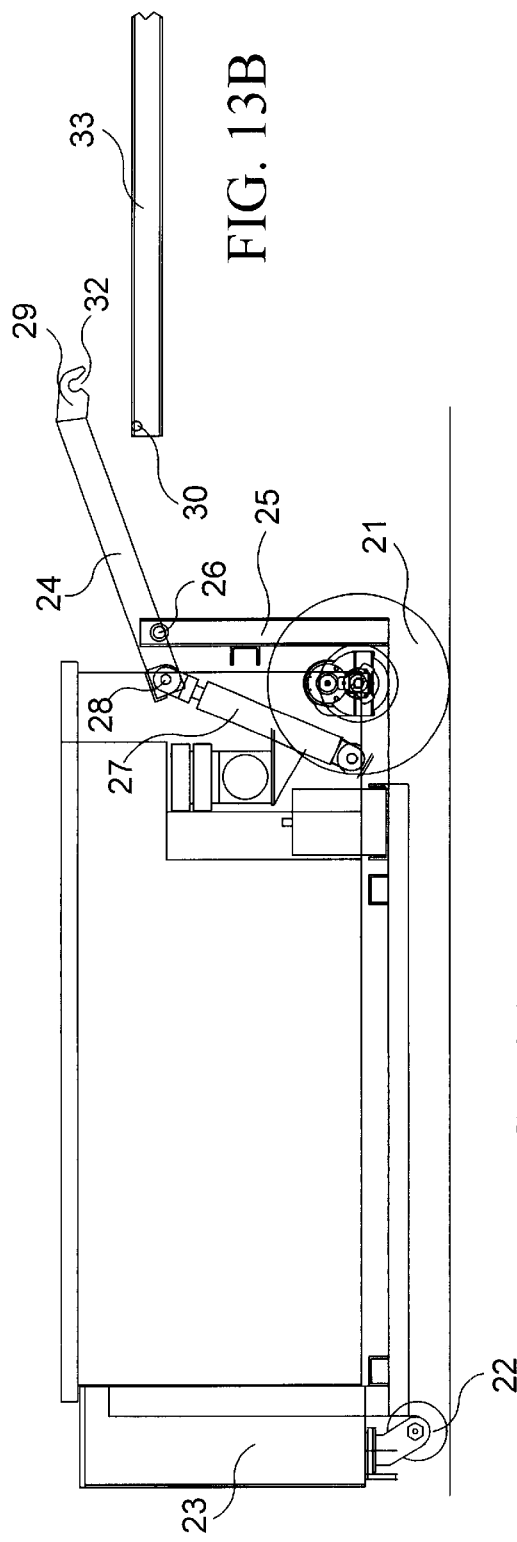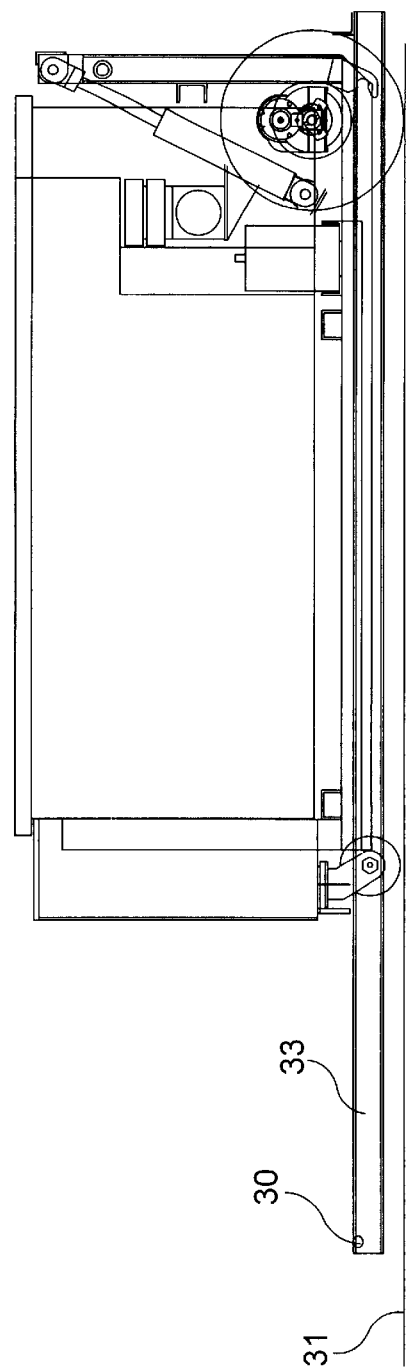
FIG. 13A
FIG. 13B
FIG. 13C

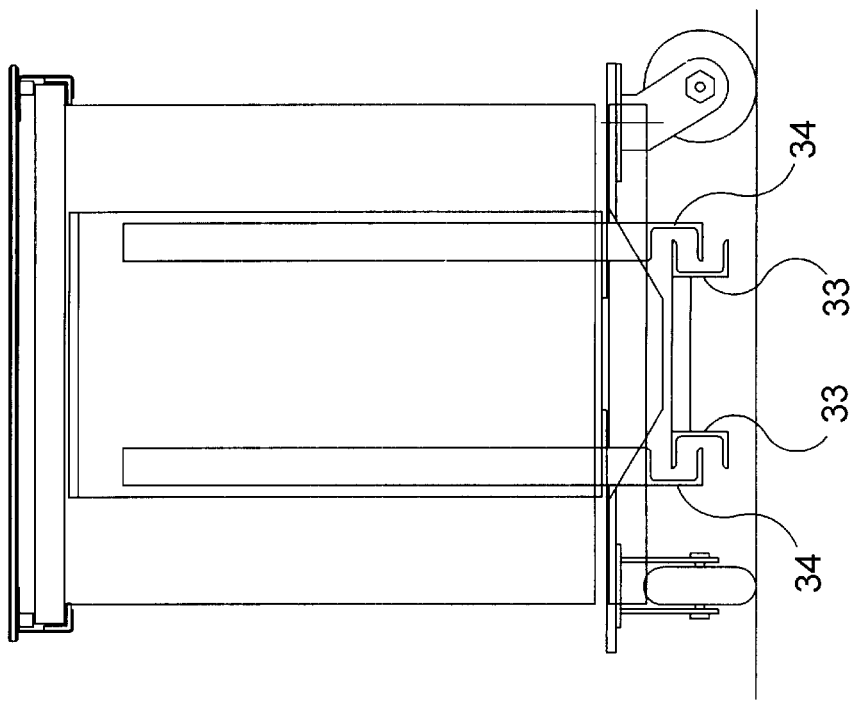

MOBILE CART

CROSS-REFERENCE TO RELATED APPLICATIONS

This application is a continuation-in-part of co-pending U.S. patent application Ser. No. 09/000,587, filed Dec. 30, 1997. This application also claims priority of U.S. provisional patent application Serial No. 60/109,699, filed Nov. 24, 1998.

BACKGROUND OF THE INVENTION

There are many situations which require, for example, a multitude of items, tools, or pieces of equipment to be transported to a remote location. Often a truck or van is used to transport these items and then a person or person unloads and carries the items to the site where they are to be used. Afterwards the items need to be carried back to and loaded into the transport vehicle. This loading, unloading, and carrying can be very time and labor intensive. The subject invention relates to a mobile cart which can be used to save much of this time and labor. The subject cart can be utilized to facilitate the loading, unloading, and carrying of items in a variety of settings, including carrying tools, laundry, paints, electrical supplies, carpentry equipment, dry cleaning equipment, mobile office equipment, disc jockey equipment, landscaping equipment, or any other materials which are heavy and/or need to be frequently loaded and unloaded. In a specific embodiment, the subject cart can be utilized for transporting and serving food items.

In order to discuss the need for the subject cart, catering can be used to describe a specific application of the subject mobile cart. Currently, many catering services are asked to supply food, beverages, and utensils to a specific location, in order to feed a group of people. This often involves the preparation of hot and cold foods and beverages at a base location and the subsequent transportation and set-up of the foods and beverages at the specified location. Loading the foods and beverages into the transportation vehicle at the base location and unloading at the designated location can be labor intensive, for example involving numerous trips to and from the transportation vehicle. For foods which must be maintained either above or below the ambient temperature, apparatus for heating or cooling must also be provided. Accordingly, setting up and breaking down such heating and cooling apparatus requires additional labor.

To illustrate, a common catering process will be described. First, the food is prepared and then containerized. Often the containerized food needs to be placed in insulated transport containers to prevent heat loss, keep food cold, and/or prevent spoiling. Dinnerware, serving utensils, chafing dishes, condiments, and various other accompaniments are packed into boxes or loaded separately and placed into a delivery vehicle with the containerized foods. The food and other items are then driven to the customer's location and unloaded, requiring numerous trips from the delivery vehicle to the feeding site. Folding tables can also be transported and set up in order to provide a platform to display chafing dishes which can be used to keep foods at or near a desired temperature. These chafing dishes are then filled with ice or water. Cold foods are placed in the iced chafing dishes and, after the water is heated, hot foods are placed on the water filled chafing dishes. After the customers have eaten, the food is then placed back in the containers for transport and loaded back into the delivery vehicle. Spills caused by handling and transportation are cleaned up. The remaining dinnerware, serving utensils, chafing dishes, condiments, and various other items are loaded up. The tables are broken down and loaded. If another customer at a different location is to be served, the entire process must be repeated.

Others have attempted to address some of the issues with respect to transporting foods and beverages to remote locations, transporting foods and beverages which must be kept hot and/or cold, and/or transporting foods and beverages into and out of office buildings, hospitals, and other places where people work and live. U.S. Pat. No. 2,982,578 (Lowe) discloses a truck with a built-in cafeteria-type service structure adapted to extend out of said truck for serving. Since this structure is designed to extend from the back of a truck there are limitations as to where it can be located. In particular, this structure is not capable of being taken inside many office buildings or other places where food is desired to be served. U.S. Pat. No. 2,309,513 (Kramer) discloses a serving wagon with wheels for mobile serving of hot and cold foods. This serving wagon is not designed for self-loading into a transportation vehicle. Accordingly, this serving wagon would be difficult to use for catering food to sites located a distance from the place where the food is prepared. U.S. Pat. No. 1,513,357 (Webber) discloses a portable food table with built-in wheels. This portable food table is not designed for self-loading into a transportation vehicle and, therefore would also be difficult to use for catering food to remote locations. U.S. Pat. No. 4,167,983 (Seides et al.) discloses an electric powered service vehicle. Again, this electric powered service vehicle is not designed for self-loading into a transportation vehicle and, even though self-propelled, is not designed for long-distance self-propulsion.

If a mobile cart existed which could be used to carry, for example, hot and/or cold foods and other associated items such that the cart could be loaded and unloaded from a transport vehicle while holding the food and associated items, caterers could save much time and labor by utilizing such a cart. The use of such a cart could enable catering of a greater variety of foods to many additional locations than is currently feasible. Likewise, such a mobile cart could be used in other settings to carry a variety of other items which need to be unloaded and carried, in order to save time and labor.

BRIEF SUMMARY OF THE INVENTION

The present invention pertains to a mobile cart. The subject cart is designed to be easily loadable onto, and unloadable from, a raised platform, for example into and out of a transport vehicle. Preferably, the subject cart can be loaded by a single adult without strenuous labor. More preferably, the subject cart can be automatically loaded onto, and unloaded from, a raised platform, for example into and out of a transport vehicle. The subject cart can have a means, for example a set of wheels, for moving the cart on a ground surface. In addition, the subject cart is preferably self-propelled to minimize the labor involved with moving the cart on a ground surface, from one location to another, as well as assisting in loading and unloading the cart. The subject cart can be utilized for a variety of uses, including carrying tools, laundry, paints, electrical supplies, carpentry equipment, dry cleaning equipment, mobile office equipment, disc jockey equipment, landscaping equipment, or any other materials which are heavy and/or need to be frequently loaded and unloaded. The subject cart is particularly advantageous when materials must be transported in a vehicle and then unloaded and moved.

In a specific embodiment, the subject cart can be utilized as a catering cart for transporting and serving food and beverages. The subject cart can utilize a variety of heating and cooling apparatus for heating and/or cooling food stored in, and served from, the cart. Lift mechanisms can allow the caterer to raise and lower the food cart, which can assist in loading and unloading the subject cart from a transport vehicle. The subject cart can also provide storage areas for foods, beverages, and utensils. Advantageously, the subject invention can allow a caterer to (i) load the subject cart with hot and cold food; (ii) load the cart into a transport vehicle; (iii) transport the cart to the customer's site; (iv) unload the cart from the transport vehicle; (v) quickly and easily transport the cart, containing hot and cold food, to the serving location; (vi) serve the customers; and (vii) quickly load the cart back into the transport vehicle and return to the caterer's base of operation. A power source, for example batteries, may be utilized to supply the power needed for heating and cooling and for self-propulsion, if desired.

The subject invention relates to a cart which can be used for transporting foods/beverages and cooking/serving utensils. The subject cart can overcome many of the disadvantages of current catering practices, which are often cost prohibitive due to the labor involved, to enable efficient catering at remote locations. In particular, the subject cart can reduce the labor involved with respect to the transportation, setup, and breakdown of the food, utensils, food pans, heating and cooling apparatus. The subject cart can also reduce catering-related injuries, for example back injuries caused by the lifting and carrying involved in current catering practices.

The subject invention also pertains to a cart and transport vehicle system. This cart and vehicle system can include a cart, for example as described herein, which can self load into, and self unload out of, a vehicle. During loading, the cart can be guided into the vehicle by apparatus attached to the cart and/or installed within the vehicle. Examples of apparatus for guiding the cart include channels, cables, and tracks. Preferably, there is also a mechanism to prevent the cart from rolling backwards during the loading process. Once the cart is loaded into the vehicle, the system can include mechanisms for securing the cart such that the cart does not tip over or move around during the transport process. Examples of mechanisms for ensuring the cart does not tip over or move around within the vehicle include straps, cables, clips, locks on the wheels, channels, tracks, and ropes. Preferably, the cart and/or apparatus installed in the vehicle can load the cart into, and unload the cart from, the vehicle. In a specific embodiment, the apparatus included within the vehicle can be easily removed and reinstalled such that a single person can install and/or remove the apparatus.

BRIEF DESCRIPTION OF THE DRAWINGS

FIG. 13A shows a side view of a specific embodiment of a cart in accordance with the subject invention.

FIG. 13B shows a portion of a channel which can guide the subject cart onto a raised platform.

FIG. 13C shows the cart of FIG. 13A resting on the raised platform of FIG. 13B.

FIG. 13D shows a rear end view of the cart of FIG. 13A.

DETAILED DISCLOSURE OF THE INVENTION

Figure 1:
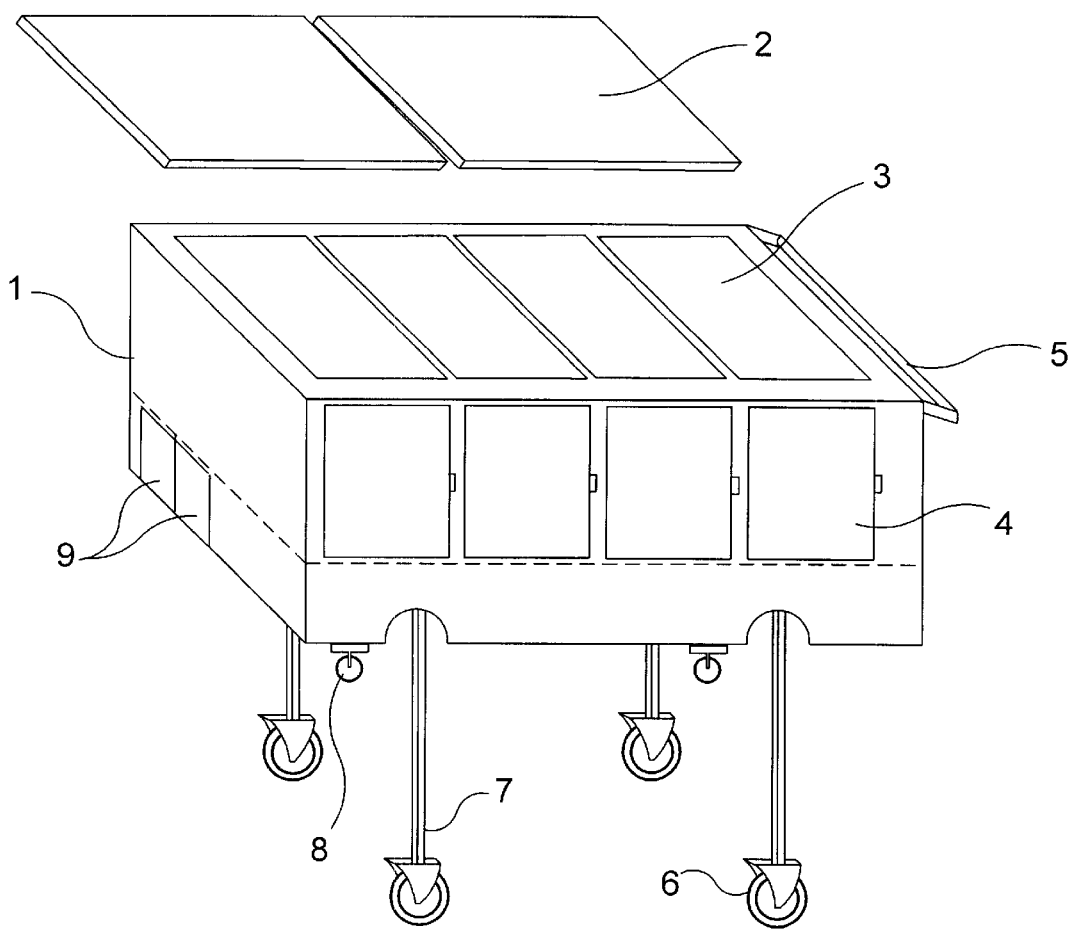
FIG. 1 is a perspective view of an embodiment of a cart in accordance with the subject invention.

The present invention pertains to a mobile cart. The subject cart is designed to be easily loadable onto, and unloadable from, a raised platform, for example into and out of a transport vehicle. Preferably, the subject cart can be loaded by a single adult without strenuous labor. More preferably, the subject cart can be automatically loaded onto, and unloaded from, a raised platform, for example into and out of a transport vehicle. The subject cart can have a means, for example a set of wheels, for moving the cart on a ground surface. In addition, the subject cart is preferably self-propelled to minimize the labor involved with moving the cart from one location to another, as well as assisting in loading and unloading the cart. The subject cart can be utilized for a variety of uses, including carrying tools, laundry, paints, electrical supplies, carpentry equipment, dry cleaning equipment, mobile office equipment, disc jockey equipment, landscaping equipment, or any other materials which are heavy and/or need to be frequently loaded and unloaded. The subject cart is particularly advantageous when materials must be transported in a vehicle and then unloaded and moved.

In a specific embodiment, the subject cart can be utilized as a catering cart for transporting and serving food and beverages. The subject cart can utilize a variety of heating and cooling apparatus for heating and/or cooling food stored in, and served from, the cart. Lift mechanisms can allow the caterer to raise and lower the food cart, which can assist in loading and unloading the subject cart from a transport vehicle. The subject cart can also provide storage areas for foods, beverages, and utensils. Advantageously, the subject invention can allow a caterer to (i) load the subject cart with hot and cold food; (ii) load the cart into a transport vehicle; (iii) transport the cart to the customer's site; (iv) unload the cart from the transport vehicle; (v) quickly and easily transport the cart, containing hot and cold food, to the serving location; (vi) serve the customers; and (vii) quickly load the cart back into the transport vehicle and return to the caterer's base of operation. A power source, for example batteries, may be utilized to supply the power needed for heating and cooling and for self-propulsion, if desired.

The subject invention relates to a cart which can be used for transporting a variety of items. In a specific embodiment, the subject cart can be used to transport foods/beverages and cooking/serving utensils. The subject cart can overcome many of the disadvantages of current catering practices, which is often cost prohibitive due to the labor involved, to enable efficient catering at remote locations. In particular, the subject cart can reduce the labor involved with respect to the transportation, setup, and breakdown of the food, utensils, food pans, heating and cooling apparatus. The subject cart can also reduce catering-related injuries, for example back injuries caused by the lifting and carrying involved in current catering practices.

The subject invention also pertains to a cart and transport vehicle system. This cart and vehicle system can include a cart, for example as described herein, which can self load into, and self unload out of, a vehicle. During loading, the cart can be guided into the vehicle by apparatus attached to the cart and/or installed within the vehicle. Examples of apparatus for guiding the cart include channels, cables, and tracks. Preferably, there is also a mechanism to prevent the cart from rolling backwards during the loading process. Once the cart is loaded into the vehicle, the system can include mechanisms for securing the cart such that the cart does not tip over or move around during the transport process. Examples of mechanisms for ensuring the cart does not tip over and or move around within the vehicle include straps, cables, clips, locks on the wheels, channels, tracks, and ropes. Preferably, the cart and/or apparatus installed in the vehicle can load the cart into, and unload the cart from, the vehicle. In a specific embodiment, the apparatus included within the vehicle can be easily removed and reinstalled such that a single person can install and/or remove the apparatus.

The cart can be made as a unitized body with a decorative exterior shell. The cart can be self-powered by, for example, an electric, hydraulic, mechanical, or pneumatic motor. In a preferred embodiment, an electric motor is used for propulsion. The subject cart can be designed to be conveniently loaded and unloaded onto a raised platform, for example into a larger transport vehicle. The loading mechanism can incorporate, for example, an electric, hydraulic, mechanical, or pneumatic actuator. The cart can incorporate self-powered raising and lowering mechanisms to facilitate its use. In a specific embodiment, an electric actuator is utilized for this purpose. The subject cart is preferably designed such that an operator can easily control the cart during loading, unloading, and transporting. In a preferred embodiment, the subject cart is maintained in a sufficiently level position during loading and unloading such as to prevent spillage or breakage of items in or on the cart.

Cooling and heating means for foods and beverages can be incorporated into the subject cart. Examples of such cooling and heating means include compression heat pumps, absorption heat pumps, or thermo electric (Peltier) heat pumps. The heating and cooling means enable an operator to easily control the temperatures of various food and beverage storage and service compartments. Storage batteries offer the preferred source of energy, with an optional outlet means built into the cart to attach to an external power source, for example an electric outlet.

An onboard energy source is preferably provided on the cart to supply power for heating and cooling of the food, as well as provide power for self-propulsion, lifting, and/or loading and unloading, as necessary. Examples of power supplies which can be utilized in accordance with the subject invention include (i) internal combustion engine; (ii) storage battery (primary or secondary); (iii) fuel cell; (iv) hydraulic or pneumatic accumulator; (v) gaseous or liquid fuel; (vi) mains supply; and (vii) flywheel energy storage device. In a specific embodiment, three 12-volt lead acid deep-draw batteries are located on the cart to power the cart apparatus, including heating and cooling mechanisms, lift mechanism, and propulsion mechanisms. A battery life indicator and recharging capability can also be built into the control system.

The subject cart can utilize thermoelectric devices for refrigeration and heating. In a specific embodiment, thermoelectric devices, initially developed by NASA over 15 years ago for cooling of microcircuits in space vehicles, are utilized. Thermoelectric devices are constructed of dissimilar metals sandwiched between ceramic plates. Application of a DC power source to this combination creates a heat pump through what is termed the Peltier effect. Reversing the current, reverses the heat pumping action. This capability allows the thermoelectric device to act as a heating and cooling device with no configuration change other than reversal of the current applied to the device. These thermoelectric devices (i) provide flexibility for heat and cooling on demand without a configuration change (simply flip a switch); (ii) have high reliability (sturdy design with no moving parts); (iii) have reduced sensitivity to vibration and shock compared with standard compression driven cooling systems; (iv) are easily replaced if damaged; (v) have virtually unlimited life under standard operating conditions; (vi) have essentially no ozone depleting potential; (vii) involve the use of essentially no chemicals; and (viii) have a very low size to heat pumping capacity ratio.

The thermoelectric device is not an industry standard in refrigerator design because of it's one major disadvantage; it has a very low coefficient of performance (COP), about one-fifth of standard compression based refrigeration systems. However, the application of the subject cart does not require a highly efficient heating and cooling technology. Thermoelectric devices have been used in portable coolers to heat and cool food to 125° F. above ambient and 45° F. below ambient respectively with the flip of a switch. The cooling system of the subject cart should preferably be able to cool the food compartments to the regulatory temperature requirement for storage and service of cold food stuffs. The regulatory temperature requirement is currently 45° F. in the United States. More preferably, the subject cooling and heating systems should be capable of reaching temperatures of 30° F. and 180° F., respectively, for an ambient temperature of 80° F.

The cart's mobility, coupled with the ability of the cart to be loaded into, transported by, and unloaded out of a separate transport vehicle when filled with food and beverages, allows a user to reach and service multiple customers at many different locations during any given meal period. In contrast, current labor intensive catering techniques limit the number of different locations which can be. serviced during any given meal period.

To illustrate, the typical catering process will be described. First, the food must be prepared and then containerized. Often the containerized food need to be placed in insulated transport containers to prevent heat loss, keep food cold, and/or prevent spoiling. Dinnerware, serving utensils, chafing dishes, condiments, and various other accompaniments are packed into boxes or loaded separately and placed into the delivery vehicle with the containerized foods. The food and other items are then driven to the customer's location and unloaded, requiring numerous trips from the delivery vehicle to the feeding site. Folding tables are transported and set up in the facility to provide a platform to display the chafing dishes which are then filled with ice or water. Cold foods are placed in the iced chafing dishes and, after the water is heated, hot foods are placed on the water filled chafing dishes. After the customers have eaten, the food is then placed back in the containers for transport and loaded into the delivery vehicle. Spills caused by handling and transportation are cleaned up. The remaining dinnerware, serving utensils, chafing dishes, condiments, and various other items are loaded up. The tables are broken down and loaded. If another customer at a different location is to be served, the entire process must be repeated.

In contrast, the subject invention can reduce much of the labor associated with such catering and, in particular, can eliminate much of the need for carrying items to and from the delivery vehicle. The food can be prepared and then placed within compartments of the subject cart. These compartments can be heated and/or cooled as appropriate and can optionally be airtight to reduce spoilage. The dinnerware, serving utensils, condiments, and various other accompaniments can be stored in storage areas on the subject cart. Accordingly, these accompaniments can be replenished as needed. Preferably, the cart can be placed in the area where the food is prepared for loading and unloading of the food. Once loaded, the subject cart can then be moved to the delivery vehicle. Preferably, the subject cart is designed to be maneuvered by a single person and, more preferably, self-propelled.

Once the subject cart is positioned in proper respect to the delivery vehicle, the cart can then be automatically loaded into the vehicle. Such loading can preferably be accomplished while maintaining the cart in a sufficiently level position so as to, for example, prevent food spillage. The loading mechanism can be designed such that a single person can operate the mechanism and, preferably, such that no strenuous effort is required by the operator. Once loaded, the cart can be transported to the customer's location. The cart can then be automatically unloaded from the delivery vehicle.

The cart can then be moved to the particular site where the food is to be served. Preferably, the subject cart is designed and dimensioned to be maneuverable in and around office buildings, apartment complexes, houses, and other places where catering may be desired. In a preferred embodiment, the subject cart can be narrow enough to fit through standard doorways, long enough to. provide adequate storage and serving space while allowing sufficient maneuverability, and short enough to fit in a standard transport van. In a specific embodiment which meets these criteria the subject cart can be about 30 inches wide, about 72 inches long, and about 35 inches high (when legs are not extended). Carts having larger or smaller dimensions are also possible, for example carts for particular applications, carts designed for use with transportation vehicles having smaller storage capacity, or carts for custom designed transportation vehicles. The 28 inch width can allow the unit to fit through standard doorways. A wide middle wheel can be provided on one end of the unit, such that the unit can easily move, with very little manipulation, through hallways and rooms. Once in position, the lids covering the food can be adjusted to allow access to the food and the doors to the various storage areas can be adjusted to allow access to the dinnerware, serving utensils, condiments, and other items provided for the customer's convenience.

After the customers are finished, the lids and doors can be adjusted back into a proper position for travel. The cart can then be maneuvered back to the delivery vehicle and loaded, ready to go to the next customer's location. In a specific embodiment, the cart can utilize electric worm screw system legs, such that it is possible to load and unload the cart quickly. In a preferred embodiment, the subject cart and loading and unloading mechanism is designed such that it can be easily installed into standard vehicles, for example standard utility vans, such that no special vehicle is needed. A variety of different loading mechanisms can be utilized with respect to the subject cart.

The subject cart can be designed to be manually pushed. Preferably a self-propulsion means is incorporated to reduce the labor required by an operator. The subject cart can be very heavy when loaded with items for transport. For example, a catering cart embodiment can easily weigh 1000 or 1500 pounds when loaded with food, beverages, and other associated items. In another specific embodiment, tank tracks can be incorporated to, for example, assist for use outdoors and/or climbing stairs. These tank tracks can be rubber tracks such as to assist in climbing on rough or wet terrain. Various loading and unloading mechanisms can be utilized with the subject cart. Preferably the loading mechanism can be operated by a single person. The loading mechanism can utilize mechanical advantage to allow the heavy weight of the cart to be raised. Manual cranking devices can be utilized to assist the operator in raising and lowering the cart. These devices can be used in conjunction with cables, worm screws, and/or scissor mechanisms such that an operator could raise and lower the cart by manual cranking. Drop down scissor mechanisms can be used either manually or mechanically. The cart can be designed for two persons to assist in the raising and lowering, if desired. Accordingly, many different raising/lowering and loading/unloading mechanisms could be incorporated into the subject invention.

Figure 11A:
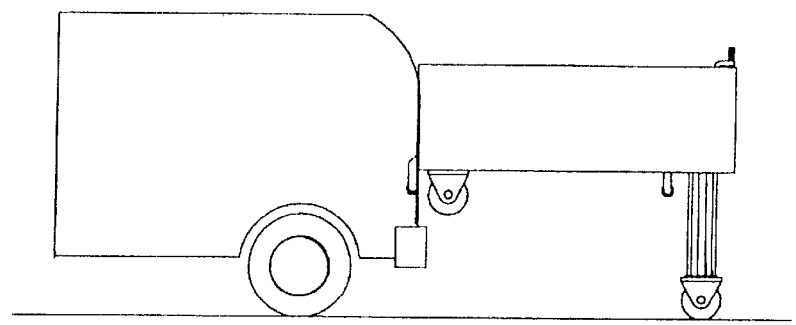
FIG. 11A is a side view of an embodiment of the subject cart about to be loaded into a transport vehicle.
Figure 11B:
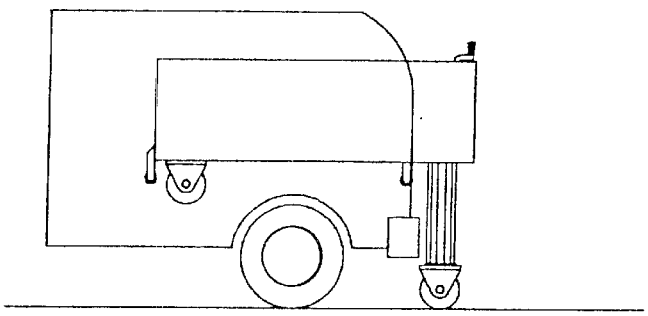
FIG. 11B is a side view of an embodiment of the subject cart during loading into a transport vehicle.
Figure 11C:
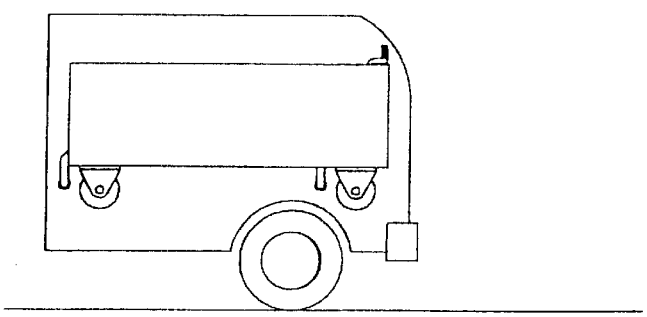
FIG. 11C is a side view of an embodiment of the subject cart loaded into a transport vehicle.
Figure 12:
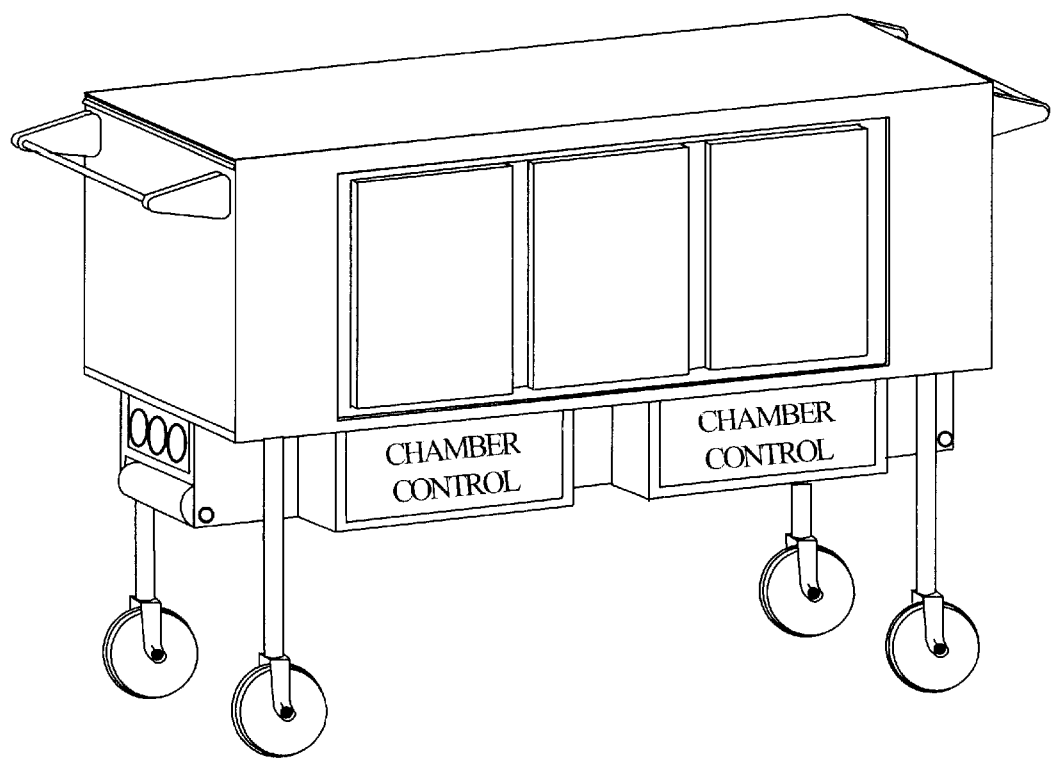
FIG. 12 is a perspective view of a specific embodiment of a cart in accordance with the subject invention.

FIGS. 11A–11C illustrate how one embodiment of the subject cart can be loaded onto a raised platform, for example into a transportation vehicle. As shown in FIG. 11A, the cart can first be brought close to the entry of the vehicle. Some portion of the cart can be interconnected with the vehicle such that the vehicle can support the weight of, and secure, that end of the cart. The lift mechanism at that end of the cart can then be retracted such that the vehicle is supporting the weight of that end of the cart. Referring to FIG. 11B, the cart can then be moved into the vehicle. This can be done manually. However, it is preferred to use a mechanism powered by a power source located on the vehicle and/or the cart. In addition, a mechanism for preventing the cart from moving backwards can also be incorporated. This can be important if the vehicle is, for example, parked on a slant such that the cart must be moved uphill. As an example, power can be obtained from the vehicle's motor, the vehicle's battery, the cart power source, and/or some other external power source. Preferably, the cart's self-propelling mechanism can be utilized to move the cart into the vehicle. This self-propelling mechanism can be incorporated with the lift mechanism such that the cart is self-propelled even when raised up by the lift mechanism. Alternatively, or in addition, the stationary wheels may provide the self-propulsion.

The loading/unloading mechanism utilized with any particular embodiment of the subject cart should be selected based on the design of the cart, the vehicle into which the cart is to be loaded and unloaded, and the purpose for which the cart is to be used. For example, carts which are to be loaded into a standard transport van should be no taller than the height of the storage capacity of the van. If desired, the cart can be designed with for example, a collapsible sneeze guard or awning. If the cart will be used for transporting and serving foods it may be desirable to prevent the cart from tilting in order to avoid spilling the food. In these cases, the loading or lift mechanism can be designed to insure that the cart is maintained in a position which is sufficiently level to prevent spillage of the food. It is preferred that the loading mechanism require minimal adaptation of the transport van. This can simplify installation of any necessary adaptations to the transport van, thus reducing expenses of such adaptations. In this way the cart can be sold to a variety of purchasers each of which may have different transport vehicles.

Figure 9:
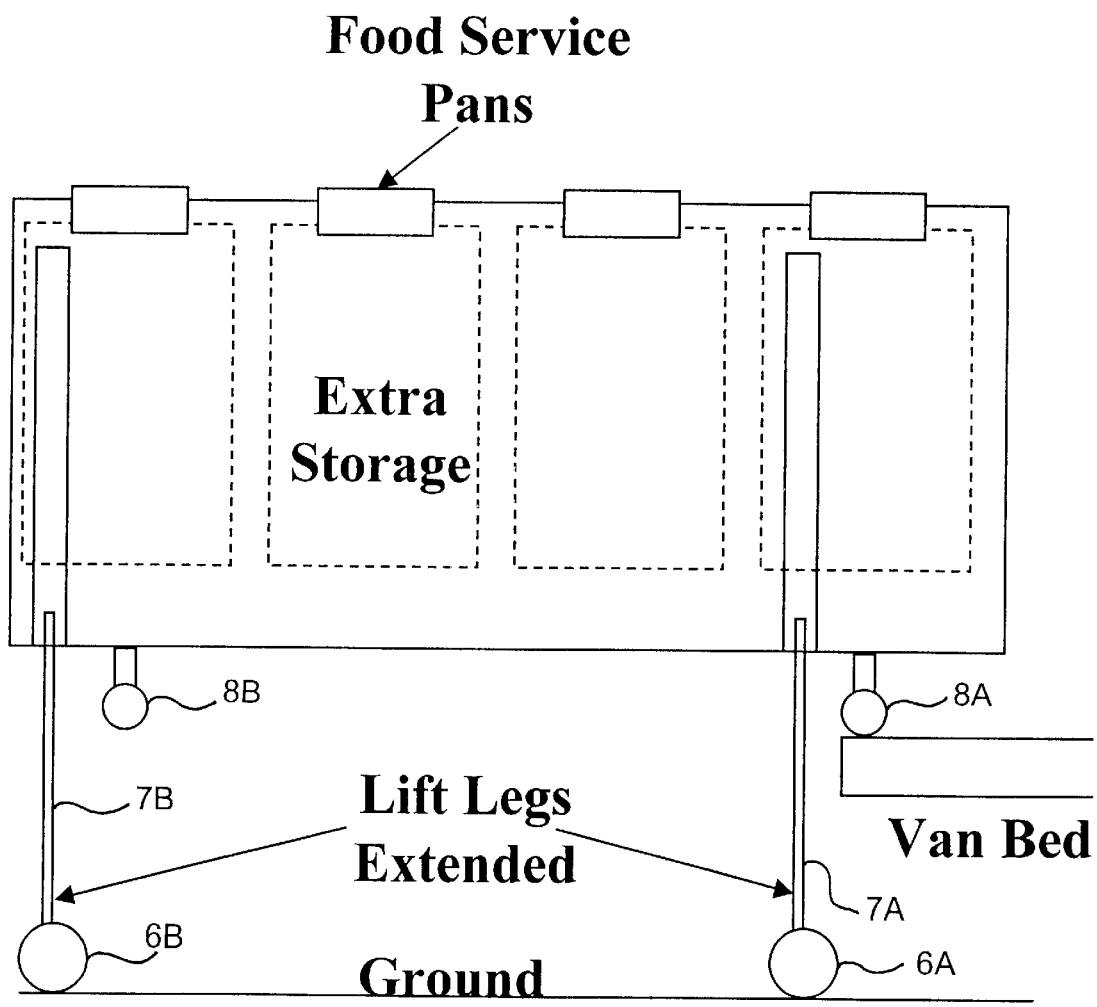
FIG. 9 is a side view of an embodiment of the subject cart which drives itself into and out of a transport vehicle.

In a specific embodiment the drive mechanism for the cart can be implemented via front drive wheels, with corresponding free rotating rear wheels. There can be a separate set of wheels associated with the lift mechanism such that when the cart is being loaded into the transport vehicle the lift wheels can support the weight of the cart when the cart is raised up via the lift mechanism. Referring to FIG. 9 the cart can approach the van bed, lift legs can be extended to raise the cart, and the cart can be moved towards the van bed until the stationary wheels are over the van bed. The cart can then be lowered until the front stationary wheels contact the van bed. In this embodiment it may be desirable for the stationary wheels to have the ability to drive the cart forward into the van bed. Alternatively, the lift wheels could provide propulsion into the van. Once the front set of stationary wheels are on the van bed the front lift legs can be retracted. The cart can then be advanced into the van until the rear stationary wheels contact the van bed. At this time the rear lift legs can be retracted and the cart can be completely inserted into the van.

Figure 10:
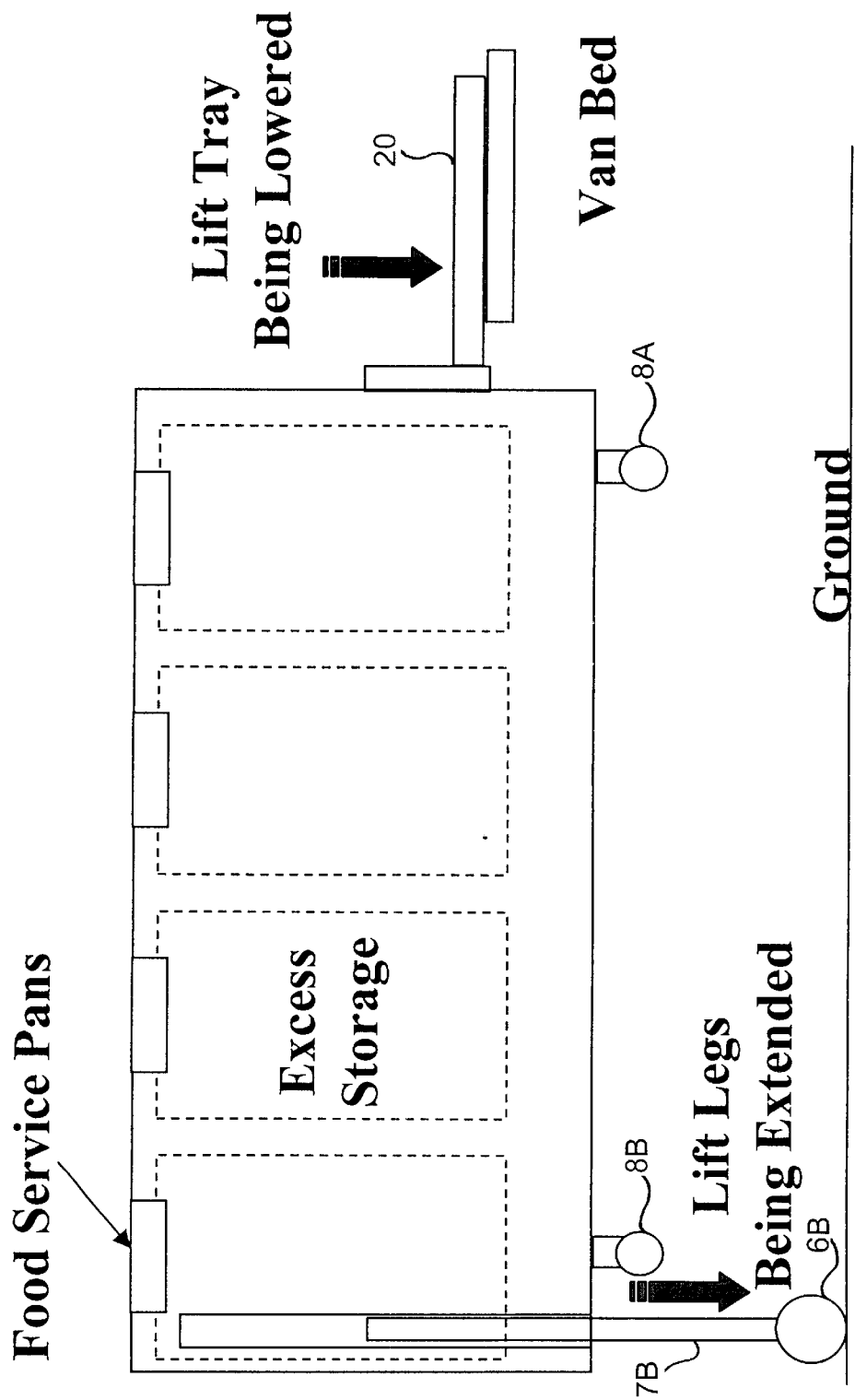
FIG. 10 is a side view of an embodiment of the subject cart which utilizes a lift tray.

Referring to FIG. 10, a lift tray can be utilized with the subject cart. In this embodiment a tray can extend forward from the cart such that its higher than the van bed when the cart is in its lowered position. As the cart is advanced to the van bed such the tray leans out over the van bed the tray can then be lowered while simultaneously extending the rear lift legs in order to raise the cart. As mentioned it is desirable to keep the cart in a level position to minimize spillage and disorganization of the other stored materials. Once the cart has been lifted to a sufficient height the wheels can then drive the cart forward until the front stationary wheels accept the weight of the cart. Alternatively, the operator can push the cart until the front stationary wheels accept the weight of the cart. The rear lift wheels can continue driving the cart forward until the rear stationary wheels also accept the weight of the cart, at which time the rear lift legs can be retracted. The cart can then be driven in by for example, the stationary wheels until the cart is completely within the van storage area. Again, a mechanism for preventing the cart from moving backwards during the loading process can be incorporated, if desired.

The subject lift device provides, at least in part, the mobility which, in part, differentiates this cart from other serving carts in the food service industry. Many potential food service customers, such as those working in factories and office complexes, cannot be regularly serviced with conventional catering techniques because of the intensive labor required for transporting food and the accompanying serving utensils, napkins, plates, etc. to the customer in various locations. The subject cart can allow the caterer to provide this service, in part, because the lift mechanism allow the cart to be quickly and easily loaded and unloaded from, for example, a standard transport van. In a specific embodiment, the lift leg mechanism, which can be gear driven, can extend the front and back sets of legs independently to allow the cart to be stocked with food and supplies at the caterer's location, lifted into the van via extension of the legs, slid into the van with the legs detracted, unloaded from the van by extending first the rear leg set and then the front leg set as the cart is pulled out of the van, and lowered to the ground by detracting all legs simultaneously.

In addition to the basic cart design which is directed to the needs of the general catering market, additional embodiments of the cart include a more sturdy cart for military use, a smaller, aesthetic cart for home use, and a 16 inch wide cart usable on airlines for inexpensive, crew prepared hot food service.

The subject cart can provide access to whole new markets which large and small caterers have not been able to cost effectively service with the present labor intensive 'individual set-up' method. The subject cart can reduce user back strain by 80% and reduce set-up, delivery, and clean-up costs by 50% over current methods.

Following are examples which illustrate procedures for practicing the invention. These examples should not be construed as limiting.

Example 1

Figure 2:
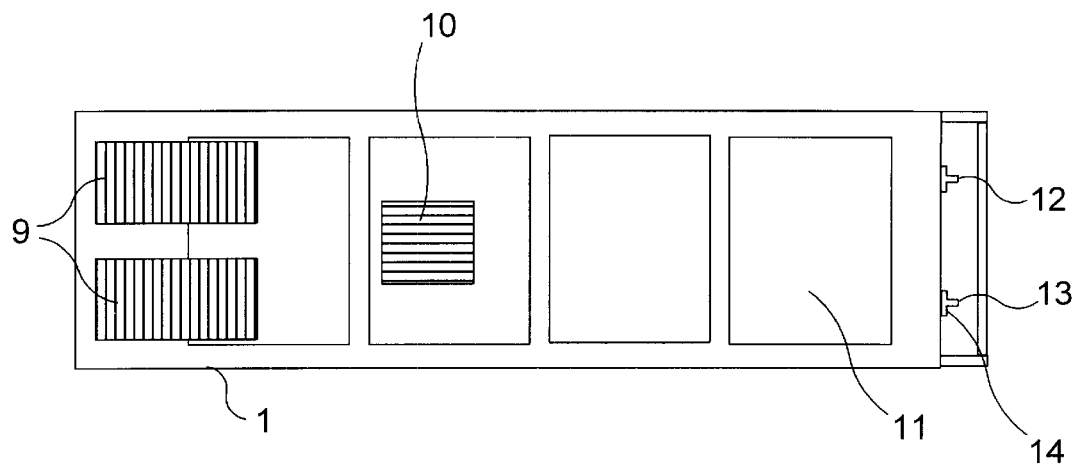
FIG. 2 is a top view of an embodiment of a cart in accordance with the subject invention.
Figure 3:
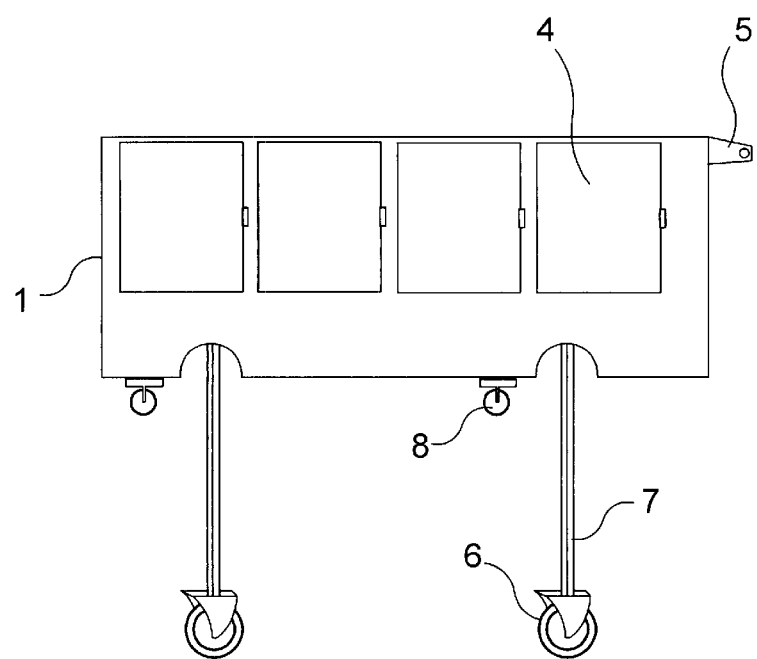
FIG. 3 is a front view of an embodiment of a cart in accordance with the subject invention.
Figure 4:
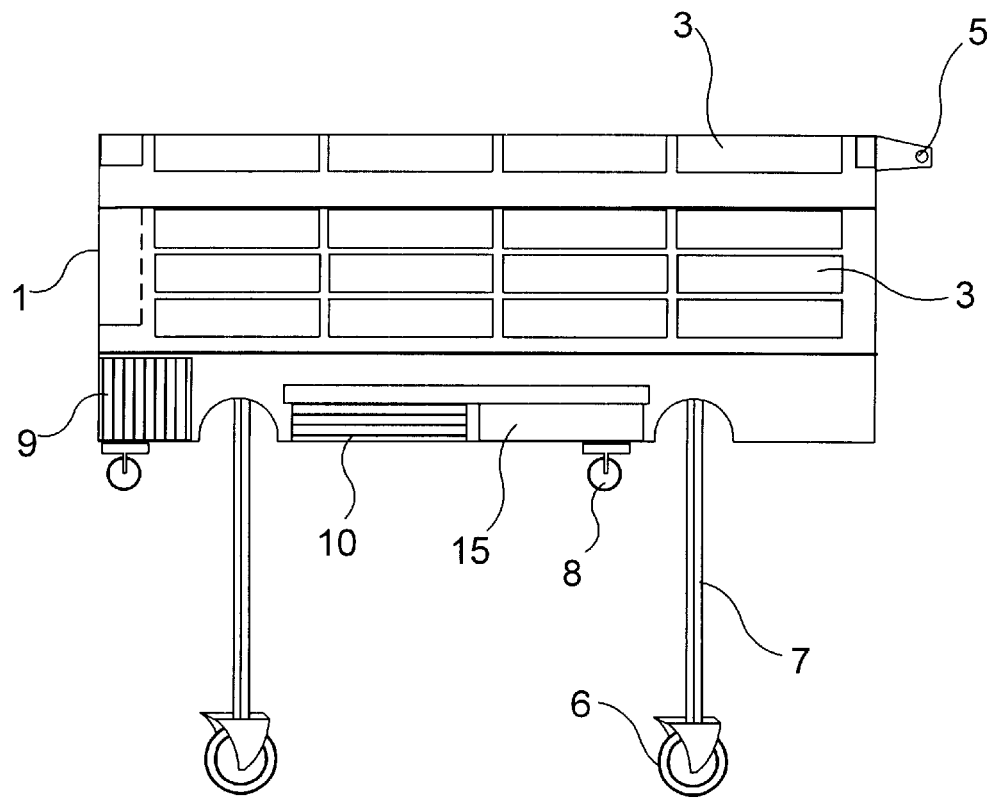
FIG. 4 is an open side view of an embodiment of a cart in accordance with the subject invention.
Figure 5:
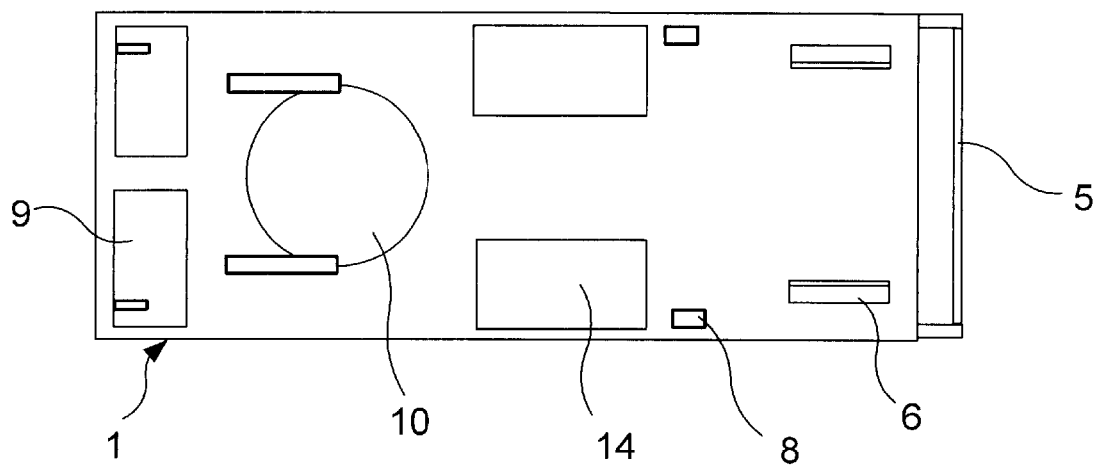
FIG. 5 is a bottom view of an embodiment of a cart in accordance with the subject invention.
Figure 6:
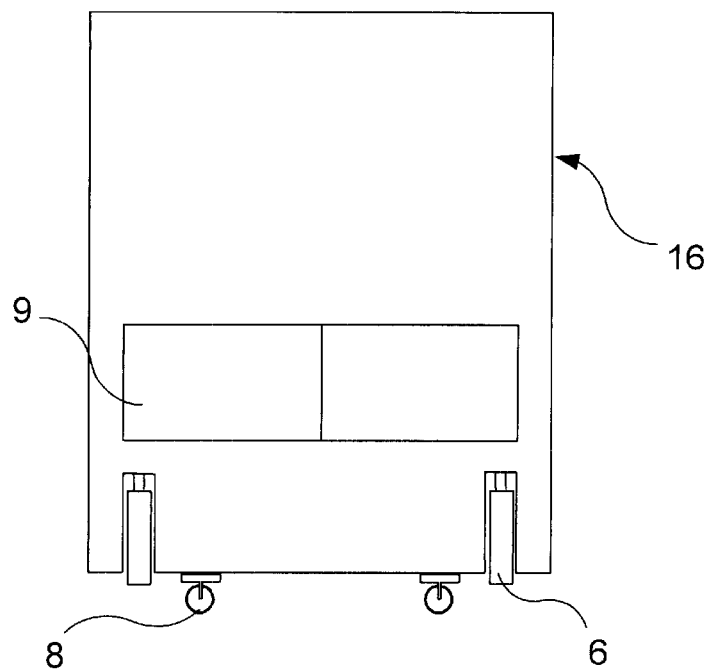
FIG. 6 is an end view of an embodiment of a cart in accordance with the subject invention.
Figure 7:
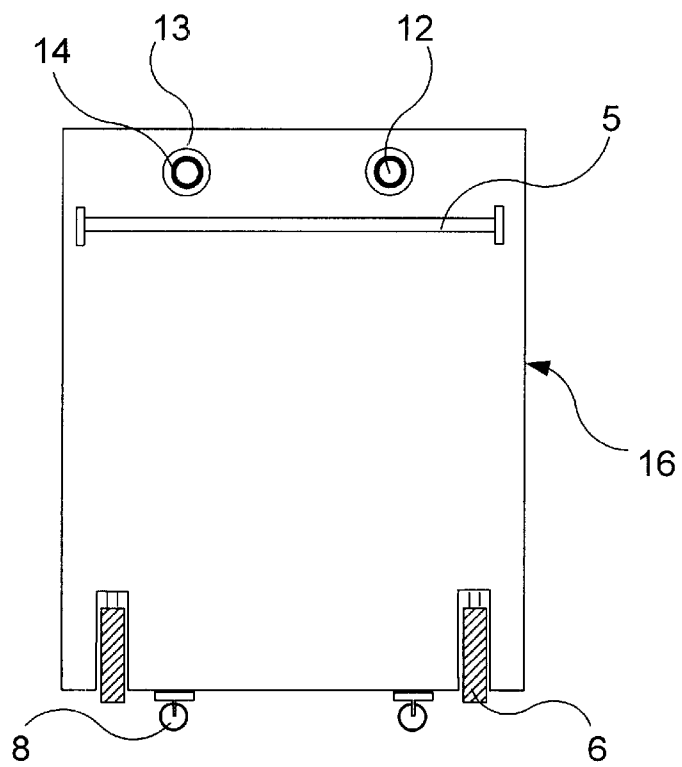
FIG. 7 is a view of the end of an embodiment of a cart in accordance with the subject invention.

Referring to FIG. 1 a specific embodiment of the subject invention is shown. With respect to this specific embodiment, cart 1 can utilize slide out tables/top cover 2, sneeze guard, make table for preparing sandwiches, and top salad and steam plates 3. Front doors 4 can be detachable and/or swing outwards. Directional handles 5 can be attached to cart 1 at one or both ends. Cart 1 can have lift wheels 6, lift legs 7 and stationary wheels 8. Batteries 9 can be used for powering cart 1. FIG. 2 illustrates a top view of cart 1 showing batteries 9, compressor 10, pan area 11, raise/lower control 12, push handle 5, reverse/forward control 14 and speed control 13. FIG. 2 is a front side view of cart 1 showing push handle 5 and doors 4 to food storage. Also shown are stationary wheels 8, lift legs 7 and lift wheels 6. FIG. 4 is a back side view of cart 1 showing pans 3 in storage pan area 11, push handle 5, batteries 9, compressor 10 and motors 15. Emanating from the bottom of cart 1, for support and mobility, are stationary wheels 8, lift wheels 6, with lift legs 7. FIG. 5 illustrates a bottom view of cart 1 with push handle 5 at one end and batteries 9 at the opposite end. Compressor 10, motor 14, lift wheels 6, and stationary wheels 8 are also shown. FIG. 6 illustrates one end of cart 1 with batteries 9 and access for charging 16. Lift wheel 6 and stationary wheel 8 are also shown. FIG. 7 illustrates the opposite end of chart 1 set on stationary wheels 8 with lift wheels 6, push handle 5, raise/lower control 12, forward/reverse control 14 and speed control 13.

Example 2

Figure 8:
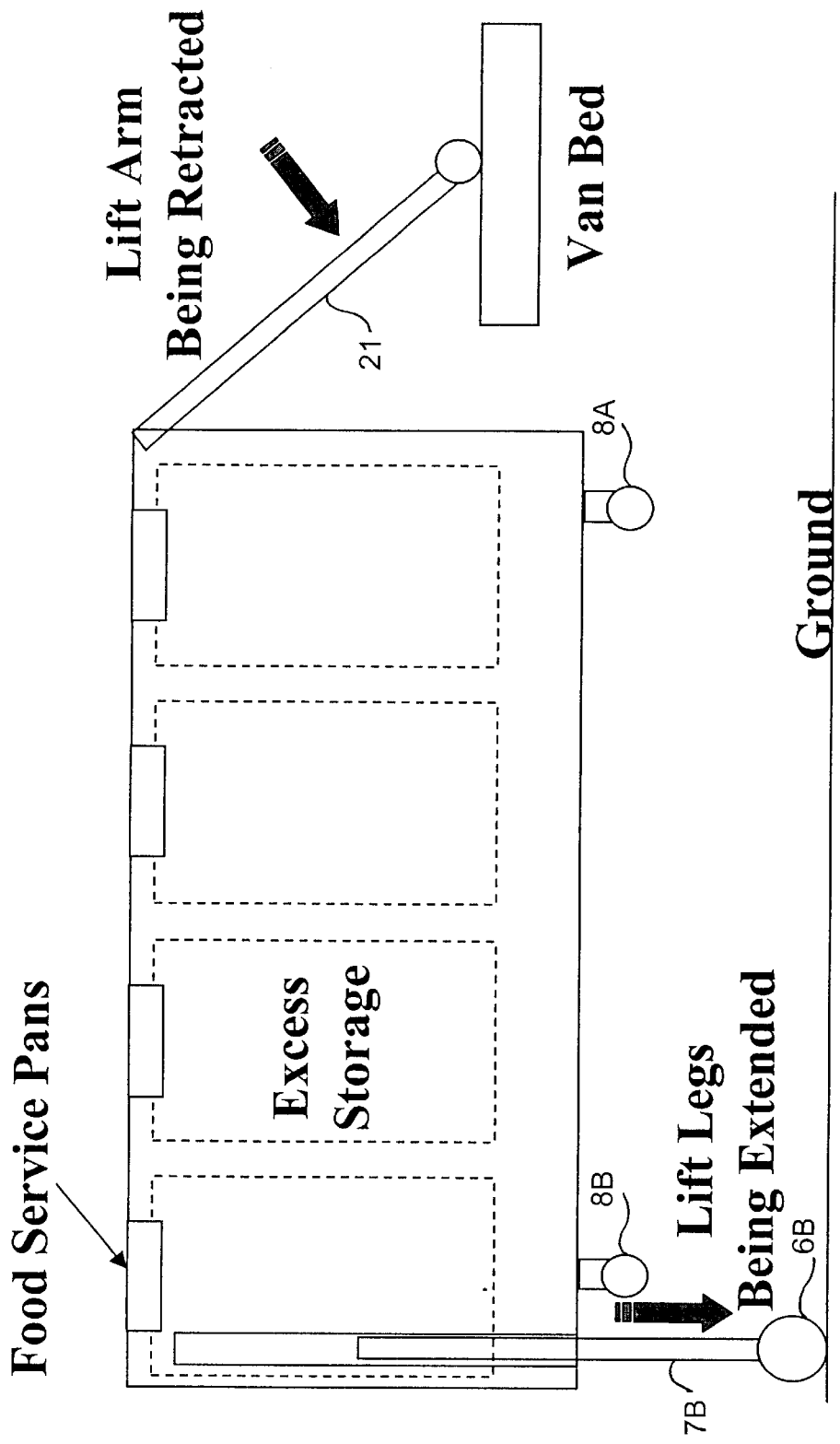
FIG. 8 is a side view of an embodiment of the subject cart which utilizes a lift arm.

FIG. 8 shows a side view of an embodiment of the subject cart which incorporates a lift arm mechanism at the front of the cart for loading and unloading the cart from a transport vehicle. This embodiment of the cart has a set of stationary wheels in the front which drive the cart. There are a set of stationary wheels and lift legs at the back of the cart. Lift legs are not necessary at the front of the cart, as the lift arm mechanism raises the front of the cart into the transport van.

The lift arm mechanism resides at the front of the cart and reaches forward to interconnect with a receiving means located in the van bed. The receiving means can, for example, be at least one channel.

Example 3

In this example, referring to FIG. 9, an embodiment of the subject invention which utilizes extendable front and rear lift legs will be described. In this embodiment, the cart can be pushed, or driven via a self-propelled mechanism, by the cart operator toward a raised platform, such as a truck or van bed or raised stage. A propulsion mechanism of a mechanical, electrical, pneumatic or hydraulic nature can be attached to the wheels 8a of the front stationary legs. Preferably these front stationary legs are the foremost legs of the cart. Foremost and front legs and wheels 8a in this embodiment refer to legs and wheels on the portion of the cart which will initially arrive at or enter the raised platform. In a preferred embodiment, the optional propulsion mechanism can power the the wheels 8a of the front stationary legs simultaneously or individually, while the wheels 8b of the rear stationary legs are free to roll and rotate to accommodate the forward or rearward motion of the cart. The free to roll and rotate rear wheels 8b can also allow the cart to turn by allowing the rear end of the cart to be navigated around corners and the like. As the cart is being driven in this nature, the front 7a and rear 7b lift legs can be retracted into the cart body such that the wheels attached to the front 7a and rear 7b lift legs do not contact the ground or other surface upon which the cart is being driven.

As the cart is brought into close proximity of the raised platform, the cart operator can stop or otherwise disengage the optional propulsion mechanism associated with the wheels 8a of the front stationary legs. The cart operator can then engage one or more lift mechanism(s) of a mechanical, electrical, pneumatic or hydraulic nature which in order to extend the front 7a and rear 7b lift legs and attached wheel(s) 6a and 6b essentially simultaneously from the body of the cart. The cart body can be raised to a variety of levels which can be preset or controlled by the cart operator. The front 7a and rear 7b lift legs can each be connected to at least one wheel which can be propulsion assisted or freely rotating. The cart may or may not include a leveling mechanism wherein the front and rear set of lift legs are extended at rates to assure that the top of the cart body is maintained approximately horizontal as the cart is lifted. In a preferred embodiment, the cart has a leveling mechanism which ensures that the cart is maintained sufficiently level to prevent spillage and breakage of items in or on the cart. As the front and rear lift legs are extended from the cart body, the cart body is then raised such that the wheel(s) attached to the front 8a and rear 8b stationary legs of the cart are elevated higher than the raised platform. The cart can then be manually pushed onto the raised platform in the case of freely rotating wheels attached to the lift legs or can be driven onto the raised platform in the case of a propulsion mechanism attached to the wheels of the front 7a and/or rear 7b lift legs. The cart is propelled onto the raised platform such that the wheels of the front 8a stationary legs are placed over the raised platform. The front and/or rear lift legs can then be partially retracted such that the wheels of the front stationary legs contact the horizontal, or approximately horizontal, surface of the raised platform. Preferably the front 7a and/or rear 7b lift legs are retracted such as to maintain the cart in a level position to avoid spillage.

The front lift legs can then be retracted high enough to clean the raised platform, such that the front portion of the cart is supported by the wheels of the front stationary legs resting on the raised platform while the rear of the cart continues to be supported by the rear lift legs. Again, it is preferred to maintain the cart in a level position.

The optional propulsion mechanism(s) attached to the wheels 6a of the front stationary legs 7a and/or the wheels 6a of the rear lift legs 7b of the cart can then be activated and the cart driven onto the raised platform. Alternatively, the cart can be manually pushed onto the raised platform. The cart should be propelled onto the raised platform such that the rear stationary wheels 8b are placed over the raised platform. The rear lift legs 7b can then be retracted high enough to clear the raised platform, such that the cart is then supported completely by the wheels of the front 8a and rear 8b stationary legs. The cart can then be driven or manually pushed the rest of the way onto the raised platform. The cart an then be secured to the platform as needed.

This process can be reversed for lowering the cart from a raised platform to a lower elevation, such as unloading the cart from a van or truck bed or lowering the cart from a stage.

Example 4

This embodiment, referring to FIG. 10, is directed toward a cart having extendable rear lift legs and a front lift platform or tray 20. In this embodiment, the cart can be pushed or driven by the cart operator toward a raised platform, such as a truck or van bed or raised stage. A propulsion mechanism of a mechanical, electrical, pneumatic or hydraulic nature can be attached to the wheels 8a of the front stationary legs which are the foremost legs. Foremost and front in this embodiment refer to the portion of the cart which will initially arrive at or enter the raised platform. The optional propulsion mechanism can power the wheels 8a of the front stationary legs simultaneously or individually while the wheels 8b of the rear stationary legs can be free to roll and rotate to accommodate the forward or rearward motion of the cart. The free to rotate and roll wheels 8b of the rear stationary legs can allow the cart to turn by allowing the rear end of the cart to be navigated around corners and the like. As the cart is being driven in this nature, the rear 7b lift legs can be retracted into the cart body and the front lift platform 20 can be raised such that the wheels 6b attached to the rear lift legs 7b do not contact the ground or other surface upon which the cart is being driven. Upon approaching the raised platform, the bottom surface of the front lift platform 20 should be higher than the raised platform on which the cart will be loaded.

As the cart is moved forward such that the front lift platform is brought over the raised platform onto which the cart is to be loaded, the cart operator can stop or otherwise disengage the optional propulsion mechanism associated with the wheels 8a of the front stationary legs. The cart operator can then engage one or more lift mechanism(s) of a mechanical, electrical, pneumatic or hydraulic nature which can be used to extend rear 7b lift legs and attached wheel(s) 6b from the body of the cart as well as lower the front lift platform 20 essentially simultaneously. The cart body can be raised to a variety of levels which can be preset or controlled by the cart operator. The rear lift legs 7b can each include at least one wheel which can be propulsion assisted or freely rotating. The front lift platform 20 can include one or more propulsion assisted or freely rotating rollers or wheels which can contact the raised platform onto which the cart is to be loaded. These wheels can be guided by tracks or channels located on the raised platform, if desired. The cart may or may not include a leveling mechanism wherein the rear lift legs 7b can be extended and the front lift tray lowered at rates to assure that the top of the cart body is maintained essentially horizontally as the cart is lifted. Preferably the cart includes a leveling mechanism which assures the cart is maintained sufficiently level to avoid spillage or breakage of items in or on the cart. As the rear lift legs are extended from the cart body and the front lift platform is lowered, the cart body is raised such that the front 8a and rear 8b stationary wheels of the cart can be elevated higher than the raised platform. Accordingly, the bottom surface of the front lift platform 20, or the rollers and/or wheels attached thereto, can be lowered below the wheels 8a attached the front stationary legs.

The cart can then be manually pushed onto the raised platform, for example in the case of freely rotating wheels attached to the rear lift legs and/or freely rotating wheels or rollers attached to the front lift platform. Alternatively, the cart can be driven onto the raised platform via a propulsion mechanism attached to the wheels 6b of the rear lift legs 7b and/or the wheels or rollers of the front lift platform 20. The cart should be propelled forward such that the wheels of the front stationary legs are placed over the raised platform. The rear lift legs can then be partially retracted and the front lift platform partially raised such that the wheels 8a of the front stationary legs contact the, horizontal, or approximately horizontal, surface of the raised platform. The front lift platform can then be raised an additional distance such that the front portion of the cart is supported by the wheels of the front stationary legs resting ion the raised platform while the rear of the cart continues to be supported by the rear lift legs. Alternatively, the cart can be propelled forward until both the wheels 8a and 8b of the front and rear stationary are both over the raised platform before lowering the cart onto the wheels 8a and 8b of the front and rear stationary legs.

The optional propulsion mechanism(s) attached to the wheels 8a of the front stationary legs and/or wheels 6b of the rear lift legs 7b of the cart can then be activated and the cart driven, or alternatively the cart can be manually pushed onto the raised platform such that the rear stationary legs are placed over the raised platform. The rear lift legs can then be retracted into the body of the cart such that the cart is then supported completely by the wheels of the front and rear stationary legs and the cart is then driven or manually pushed the rest of the way onto the raised platform.

This procedure can be reversed for lowering the cart from a raised platform to a lower elevation such as unloading the cart from a van or truck bed or lowering the cart from a stage.

Example 5

In this example, referring to FIG. 8, an embodiment of the subject invention which utilizes extendable rear lift legs and a front lift and load arm(s) will be described. In this embodiment, the cart can be pushed or driven by the cart operator toward a raised platform, such as a truck or van bed or raised stage. A propulsion mechanism of a mechanical, electrical, pneumatic or hydraulic nature can be attached to the wheels 8a of the front stationary legs which can be the foremost legs of the cart. Foremost and front in this embodiment refers to the portion of the cart which will initially arrive at or enter the raised platform. The optional propulsion mechanism can power the wheels 8a of the front stationary legs simultaneously or individually while the wheels 8b of the rear stationary legs can be free to roll and rotate to accommodate the forward or rearward motion of the cart. The free to roll and rotate wheels 8b of the rear stationary legs can allow the cart to turn by allowing the rear end of the cart to be navigated around corners and the like. As the cart is being driven in this nature the rear lift legs 7b can be retracted into the cart body and the front lift and load arm 21(s) can be completely raised such that the wheels 6b attached to the rear lift legs 7b do not contact the ground or other surface upon which the cart is being driven. The bottom surface of the front lift and load arm(s) 21 can be higher than the raised platform on which the cart will be loaded.

The cart can be moved forward such that the front lift arm(s) 21 is brought over the raised platform onto which the cart is to be loaded. The lift arm(s) can be in an essentially horizontal position. A mechanism to engage the lift arm(s) such as, but not limited to, a channel(s), sleeve(s) or pinion (s) can be located on the raised platform, if desired. This engaging mechanism can help guide the front lift arm(s) 21. The cart operator can stop or otherwise disengage the optional propulsion mechanism from the wheels 8a of the front stationary legs. The cart operator can then engage one or more lift mechanism(s) of, for example, a mechanical, electrical, pneumatic or hydraulic nature which can be used to extend the rear lift legs 7b and attached wheel(s) 6b from the body of the cat as well as retract the front lift arm(s) 21 toward the front vertical surface of the cart. The front lift arm(s) 21 is retracted around the pivot attaching the front lift arm(s) 21 to the cart body. The actions of the rear lift legs and the front lift arm(s) can be coordinated in such a way that the cart body is elevated and brought toward the raised platform to a variety of levels which can be preset or controlled by the cart operator. Preferably, a leveling mechanism is utilized to maintain the cart sufficiently level to prevent spillage and breakage of items in and on the cart.

The rear lift legs 7b can include at least one wheel 6b which can be propulsion assisted or freely rotating. The foremost end of the front lift arm(s) 21 can include one or more propulsion assisted or freely rotating rollers or wheels or alternatively an engagement or engagement sensing mechanism which can contact the platform on which the cart is to be loaded or the aforementioned mechanism attached thereto. The cart may or may not include a leveling mechanism wherein the rear lift legs are extended and the front lift arm(s) is lowered at rates to assure that the top of the cart body is maintained horizontally as the cart is lifted. As the rear lift legs are extended from the cart body and the front lift arm(s) is retracted, the cart body is raised and brought toward the raised platform such that the wheel(s) 8a attached to the front stationary legs of the cart are placed over the raised platform.

The cart can then be manually pushed, in the case of freely rotating wheels and/or rollers attached to the rear lift legs and/or the front lift arm(s), onto the platform. In the case of a propulsion mechanism attached to the rear lift legs and/or the front lift arm(s), the cart can be driven forward such that the wheels of the front stationary legs are placed over the raised platform. The optional propulsion mechanism(s) attached to the wheels of the front stationary legs and/or the wheels of the rear lift legs of the cart can then be activated and the cart driven, or alternatively the cart can be manually pushed, onto the raised platform such that the rear stationary legs are placed over the raised platform. The rear lift legs can then be retracted such that the cart is then supported completely by the wheels of the front and rear stationary legs. The cart can then be driven or manually pushed the rest of the way onto the raised platform.

This process can be reversed for lowering the cart from a raised platform to a lower elevation such as unloading the cart from a van or truck bed or lowering the cart from a stage.

Example 6

In this example, referring to FIGS. 13A–13D, an embodiment of the subject invention which utilizes an extendable rear lift mechanism and at least one front lift and load arm(s) 24 will be described. In this embodiment, the cart can be pushed or driven by the cart operator toward a raised platform, such as a truck bed, van bed, or raised stage. A propulsion mechanism of, for example, a mechanical, electrical, pneumatic or hydraulic nature can be attached to the front wheels 41 of the cart, wherein the front portion of the cart will initially arrive at the raised platform. The optional propulsion mechanism can power the wheels 41 simultaneously or individually while the rear wheels 22 can be free to roll and rotate to accommodate the forward or rearward motion of the cart. In the embodiment shown in FIG. 13A, the rear wheels 22 are castors which are free to rotate in any direction. The free to roll and rotate rear wheels 22 can allow the cart to turn by allowing the rear end of the cart to be navigated around corners and the like.

These rear wheels 22 are attached to a rear lift mechanism 23 which when extended lifts the rear portion of the cart. In the embodiment shown in FIGS. 13A–13D, rear lift mechanism 23 is a two-wheeled telescoping rectangular tubular leg. In this embodiment, there is no need for any hydraulics above the serving tray of the cart. In order to navigate the cart around, the rear lift mechanism 23 can be retracted such that the cart body rests low to the ground and the front lift and load arm(s) 24 can be brought into a closed position, as shown in FIG. 13C. In this closed position, front lift arms 24 are out of the way.

Referring to FIG. 13A, lift arm 24 is pivotally connected to support member 25 by first pin 26. As hydraulic piston 27, connected to the distal end of lift arm 24 by second pin 28, extends, the distal end 29 of lift arm 24 is lower and pulled toward the cart. As shown in FIG. 13C, hydraulic piston 27 can be extended until lift arm 24 is essentially parallel with support arm 25 and no longer protrudes out in front of the cart.

It is important to have solid support for the cart when the cart is in the air. It is preferred to have two lift arms 24, spaced sufficiently apart such as to provide balanced support for the cart when the lift arms 24 are interacting with the raised platform, as the cart is lifted into the air. The cart can be moved forward such that the front lift arms 24 are brought into a position where the distal ends 29 of lift arms 24 can be lowered in such a way to interact with pin 30. Pin 30 can be secured by, for example, a channel 33 connected to the raised platform 31 onto which the cart is to be loaded. Alternative mechanisms to engage the lift arm(s) include, but not limited to, channel(s), sleeve(s) or pinion(s), and can be located on the raised platform, if desired. Pins 30 provide support for lift arms 24 to pull against in order to raise the cart and pull the cart toward the raised platform.

Once lift arms 24 engage the raised platform, the cart operator can stop or otherwise disengage the propulsion mechanism associated with the front wheels 21. The cart operator can then engage the rear lift mechanism 23, while the front lift arms 24 are simultaneously pivoted around pin 26 by the extension of hydraulic piston 27. Preferably the cart is maintained in an essentially level position during the raising of the cart. This can be accomplished by operator action or by some leveling means which coordinates the rear lift mechanism 23 and the extension of hydraulic piston 27. The actions of the rear lift mechanism 23 and the front lift arms 24 can be coordinated in such a way that the cart body is elevated and brought toward the raised platform to a variety of levels which can be preset or controlled by the cart operator. Preferably, a leveling mechanism is utilized to maintain the cart sufficiently level to prevent spillage and breakage of items in and on the cart.

The rear lift mechanism 23 can incorporate at least one wheel 22, and preferably at least two wheels 22, which can be propulsion assisted or freely rotating. In the embodiment shown in FIGS. 13A–13D, wheels 22 are free rotating. The distal end of the front lift arms 24 can include an indentation 32 which, upon lowering lift arm 24, accepts pin 30 such that further lowering of lift arm 24 raises the front end of the cart and moves the cart toward the platform. In the embodiment illustrated in FIGS. 13A–13D, indentation 32 is such that once lift arm 24 has been fully retracted by extension of hydraulic piston 27, pin 30 prevents the cart from moving backwards, but allows forward motion of the cart onto the raised platform 31. Preferably, the size and shape of indentation 32 allows for a sufficient margin of error when aligning the cart with respect to the raised platform. The distal end 29 of lift arm 24, indentation 32, and pin 30, can be designed such that the cart can be pulled up to the raised platform with lift arm 24 raised, lift arm 24 can then be lowered to contact pin 30, and finally the cart can be backed up until indentation 32 engages pin 30. Other alignment techniques are possible and would be apparent to one skilled in the art having the advantage of the subject disclosure.

Pin 30 can be positioned such that when lift arm 24 is fully retracted toward the body of the cart, wheels 21 contact raised platform 31 such that wheels 21 can drive the cart onto raised platform 31. In a preferred embodiment, 18 inch diameter tires are used, which also allow sufficient tolerance when loading the cart onto the raised platform. In a specific embodiment, special large area tires can be used as an attachment for use of the cart at, for example, the beach. Referring to FIG. 13D, a specific embodiment of the subject cart can utilize channels 33, secured to raised platform 31, to interconnect with channels 34 secured to the cart, such that channels 33 guides the cart onto the raised platform. Once again, channels 33 and 34 can be designed with a sufficient margin of error to allow the operator to easily align the cart to the raised platform for loading. In a specific embodiment a one-half to one inch tolerance has been shown to be sufficient. Furthermore, channels 33 and 34 can be designed such that as wheels 21 drive the cart onto the raised platform channel 33 can accept the weight of the cart when, for example, rear lift mechanism 23 is retracted. Preferably, once the majority of the cart is over raised platform 31, rear lift mechanism 23 can be retracted such that rear wheels 22 clear the raised platform.

Once lift arms 24 are fully retracted and front wheels 21 are on the raised platform, the cart can then be manually pushed onto the platform. Alternatively, in the case of a propulsion mechanism attached to the rear lift legs and/or the front wheels, the cart can be driven forward. The rear lift mechanism can then be retracted such that the cart is then supported completely by front wheels 21 and channels 34. The cart can then be driven or manually pushed the rest of the way onto the raised platform.

This process can be reversed for lowering the cart from a raised platform to a lower elevation such as unloading the cart from a van or truck bed or lowering the cart from a stage.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A mobile cart, comprising:

a housing;

a means for raising and lowering said housing;

a means for moving said cart on a ground surface, and a means for self-loading said cart onto and self-unloading said cart from a raised platform, wherein said means for raising and lowering said housing comprises at least one extendable support structure which is adapted to extend and retract from said housing such that when one of said at least one extendable support structure extends from said housing said one of said at least one extendable support structure first contacts the ground and then raises a portion of said housing, wherein said means for self-loading said cart onto and self-unloading, said cart from the raised platform comprises at least one front lift arm attached to said housing, wherein said front lift arm is adapted to contact the raised platform and lift a front end of said cart housing and move said cart toward the raised platform until a portion of the cart housing is above the raised platform, wherein a distal end of said at least one front lift arm having a means for engaging a pin secured to the raised platform wherein when said at least one front lift arm engages the pin secured to the raised platform, the pin secured to the raised platform provides a basis for said at least one lift arm to raise said cart housing and move said cart toward the raised platform.

2. The mobile cart, according to claim 1, wherein, during lifting, said cart is maintained sufficiently level to prevent damage to items loaded in said cart.

3. The mobile cart, according to claim 1, wherein as said front lift arm is lifting said front end of said cart, a back end of said cart is simultaneously lifted by one or more of said at least one extendable support structure.

4. The mobile cart, according to claim 3, wherein, during lifting, said cart is maintained sufficiently level to prevent damage to items loaded in said cart.

5. The mobile cart, according to claim 1, wherein said cart is adapted to carry one or more of the group consisting of tools, laundry, paint supplies, electrical supplies, carpentry equipment, dry cleaning equipment, mobile office equipment, disc jockey equipment, landscaping equipment, and food and beverages.

6. The mobile cart, according to claim 5, wherein said cart is dimensioned to be maneuverable in and around office buildings.

7. The mobile cart, according to claim 6, wherein said cart is less than about 31 inches wide, less than about 73 inches long, and less than about 36 inches high when in a lowered position.

8. The mobile cart, according to claim 1, wherein said cart is designed to be manually moved on a ground surface.

9. The mobile cart, according to claim 1, wherein said means for moving said cart on a ground surface comprises a pair of wheels at a front end of the cart which drive the cart forward and a pair of free rotating wheels at a rear end of the cart.

10. The mobile cart, according to claim 1, wherein said cart is adapted to store and serve foods or beverages.

11. The mobile cart, according to claim 10, further comprising:

a means for cooling, wherein said means for cooling can maintain said food or beverages below ambient temperature.

12. The mobile cart, according to claim 11, wherein said means for cooling can maintain said food or beverages at or below 45° F.

13. The mobile cart, according to claim 10, further comprising:

a means for heating, wherein said means for heating can maintain said food or beverages above ambient temperature.

14. The mobile cart, according to claim 13, wherein said means for heating can maintain said food or beverages at or above 145° F.

15. The mobile cart, according to claim 1, further comprising a means for preventing the cart from moving backwards during the loading onto the raised platform.

16. The mobile cart, according to claim 1, further comprising:

a means for propulsion, wherein said means for propulsion is capable of propelling said cart.

17. The mobile cart, according to claim 1, wherein said means for self-loading said cart onto and self-unloading said cart from the raised platform is powered by said cart.

18. The mobile cart, according to claim 1, further comprising:

a means for propulsion, wherein said means for propulsion is capable of propelling said cart.

19. A mobile cart system, comprising:

a mobile cart; and a transport vehicle having a raised platform, wherein said mobile cart comprises:

a housing;

a means for raising and lowering said housing;

a means for moving said cart on a ground surface; and a means for self-loading said cart onto and self-unloading said cart from a raised platform, wherein said means for raising and lowering said housing comprises at least one extendable support structure which is adapted to extend and retract from said housing such that when one of said at least one extendable support structure extends from said housing said one of said at least one extendable support structure first contacts the ground and then raises a portion of said housing, wherein said means for self-loading said cart onto and self-unloading said cart from the raised platform comprises at least one front lift arm attached to said housing, wherein said front lift arm is adapted to contact the raised platform and simultaneously lift a front end of said cart housing and move said cart toward the raised platform until a portion of the cart housing is above the raised platform, wherein as said front lift arm is lifting said front end of said cart, a back end of said cart is simultaneously lifted by one or more of said at least one extendable support structure, wherein once said cart is loaded onto the raised platform of the transport vehicle, the transport vehicle can transport said cart to a desired location and said cart can be unloaded, and, wherein said cart is adapted to interconnect with a means for guiding said cart onto the raised platform, wherein said means for guiding said cart onto the raised platform is secured to tie raised platform during loading.

20. The mobile cart system, according to claim 19, wherein said means for guiding said cart onto the raised platform comprises one or more of the group consisting of a channel and a track.

21. The mobile cart system, according to claim 19, wherein said means for guiding said cart onto the raised platform enables the cart to self-guide itself onto a desired position on the raised platform.

22. The mobile cart system, according to claim 19, wherein said cart is adapted to interconnect with a means for securing said cart onto the raised platform, wherein said means for securing said cart onto the raised platform is secured to the raised platform during transport of said cart in the transport vehicle, wherein said means for securing said cart onto the raised platform, when engaged, prevents the cart from tipping over or moving around with respect to the raised platform.

23. The mobile cart system, according to claim 22, wherein said means for securing said cart onto the raised platform comprises one or more of the group consisting of a channel and a track.

24. A mobile cart, comprising a housing;
a means for raising and lowering said housing;
a means for moving said cart on a ground surface, and
a means for self-loading said cart onto and self-unloading said cart from a raised platform, wherein said means for raising and lowering said housing comprises at least one extendable support structure which is adapted to extend and redact from said housing such that when one of said at least one extendable support structure extends from said housing said one of said at least one extendable support structure first contacts the ground and then raises a portion of said housing, wherein said means for self-loading said cart onto and self-unloading said cart from the raised platform comprises at least one front lift arm attached to said housing, wherein said front lift arm is adapted to contact the raised platform and lift a front end of said cart housing and move said cart toward the raised platform until a portion of the cart housing is above the raised platform, wherein a distal end of said at least one front lift arm comprises an indentation adapted for engaging a pin secured to the raised platform, such that upon said at least one front lift arm engaging the pin secured to the raised platform, the pin secured to the raised platform provides a basis for said at least one front lift arm to raised said cart housing and move said cart toward the raised platform.

25. A mobile cart system, comprising:
a housing;
a means for raising and lowering said housing;
a means for moving said cart on a ground surface, and
a means for self-loading said cart onto and self-unloading said cart from a raised platform, wherein said means for raising and lowering said housing comprises at least one extendable support structure which is adapted to extend and retract from said housing such that when one of said at least one extendable support structure extends from said housing said one of said at least one extendable support structure first contacts the ground and then raises a portion of said housing, wherein said means for self-loading said cart onto and self-unloading said cart from the raised platform comprises at least one front lift arm attached to said housing, wherein said front lift arm is adapted to contact the raised platform and lift a front end of said cart housing and move said cart toward the raised platform until a portion of the cart housing is above the raised platform, wherein said means for self-loading said cart onto and self-unloading said cart from a raised platform comprises a pin secured to the raised platform, wherein a distal end of said at least one front lift arm having a means for engaging the pin secured to the raised platform wherein when said at least one front lift arm engages the pin secured to the raised platform, the pin secured to the raised platform provides a basis for said at least one lift arm to raise said cart housing and move said cart toward the raised platform.

26. The mobile cart system, according to claim 25, further comprising:

a means for propulsion, wherein said means for propulsion is capable of propelling said cart.

27. A mobile cart system, comprising:
a housing;
a means for raising and lowering said housing;
a means for moving said cart on a ground surface, and
a means for self-loading said cart onto and self-unloading said cart from a raised platform, wherein said means for raising and lowering said housing comprises at least one extendable support structure which is adapted to extend and retract from said housing such that when one of said at least one extendable support structure extends from said housing said one of said at least one extendable support structure first contacts the ground and then raises a portion of said housing, wherein said means for self-loading said cart onto and self-unloading said cart from the raised platform comprises at least one front lift arm attached to said housing, wherein said front lift arm is adapted to contact the raised platform and lift a front end of said cart housing and move said cart toward the raised platform until a portion of the cart housing is above the raised platform, wherein said means for self-loading said cart onto and self-unloading said cart from a raised platform comprises a pin secured to the raised platform, wherein a distal end of said at least one front lift arm comprises an indentation adapted for engaging the pin secured to the raised platform, such that upon said at least one front lift arm engaging the pin secured to the raised platform, the pin secured to the raised platform provides a basis for said at least one front lift arm to raised said cart housing and move said cart toward the raised platform.

28. A mobile cart system, comprising:
a mobile cart; and
a transport vehicle having a raised platform, wherein said mobile cart comprises:
a housing;
a means for raising and lowering said housing;
a means for moving said cart on a ground surface; and
a means for self-loading said cart onto and self-unloading said cart from a raised platform, wherein said means for raising and lowering said housing comprises at least one extendable support structure which is adapted to extend and retract from said housing such that when one of said at least one extendable support structure extends from said housing said one of said at least one extendable support structure first contacts the ground and then raises a portion of said housing,
wherein said means for self-loading said cart onto and self-unloading said cart from the raised platform comprises at least one front lift arm attached to said housing, wherein said front lift arm is adapted to contact the raised platform and lift a front end of said cart housing and move said cart toward the raised platform until a portion of the cart housing is above the raised platform,
wherein as said front lift arm is lifting said front end of said cart, a back end of said cart is lifted by one or more of said at least one extendable support structures,
wherein once said cart is loaded onto the raised platform of the transport vehicle, the transport vehicle can transport said cart to a desired location and said cart can be unloaded, and wherein said cart is adapted to interconnect with a means for guiding said cart onto the raised platform, wherein said means for guiding said cart onto the raised platform is secured to the raised platform during loading.

29. The mobile cart system, according to claim 28, wherein said means for guiding said cart onto the raised platform comprises one or more of the group consisting of a channel and a track.

30. The mobile cart system, according to claim 28, wherein said means for guiding said cart onto the raised platform enables the cart to self-guide itself onto a desired position on the raised platform.

31. The mobile cart system, according to claim 28, wherein said cart is adapted to interconnect with a means for securing said cart onto the raised platform, wherein said means for securing said cart onto the raised platform is secured to the raised platform during transport of said cart in the transport vehicle, wherein said means for securing said cart onto the raised platform, when engaged, prevents the cart from tipping over or moving around with respect to the raised platform.

32. The mobile cart system, according to claim 31, wherein said means for securing said cart onto the raised platform comprises one or more of the group consisting of a channel and a track.

* * * * *